(12) United States Patent
Yang et al.

(10) Patent No.: US 11,093,684 B2
(45) Date of Patent: Aug. 17, 2021

(54) POWER RAIL WITH NON-LINEAR EDGE

(71) Applicant: TAIWAN SEMICONDUCTOR MANUFACTURING COMPANY LTD., Hsinchu (TW)

(72) Inventors: Jung-Chan Yang, Longtan Townshp (TW); Ting-Wei Chiang, New Taipei (TW); Hui-Zhong Zhuang, Kaohsiung (TW); Chi-Yu Lu, New Taipei (TW)

(73) Assignee: TAIWAN SEMICONDUCTOR MANUFACTURING COMPANY, LTD., Hsinchu (TW)

( * ) Notice: Subject to any disclaimer, the term of this patent is extended or adjusted under 35 U.S.C. 154(b) by 0 days.

(21) Appl. No.: 16/659,305

(22) Filed: Oct. 21, 2019

(65) Prior Publication Data
US 2020/0134133 A1    Apr. 30, 2020

Related U.S. Application Data

(60) Provisional application No. 62/753,234, filed on Oct. 31, 2018.

(51) Int. Cl.
| | |
|---|---|
| *G06F 30/00* | (2020.01) |
| *G06F 30/398* | (2020.01) |
| *G03F 1/70* | (2012.01) |
| *G03F 1/36* | (2012.01) |
| *G06F 30/30* | (2020.01) |
| *G06F 30/3953* | (2020.01) |
| *G06F 119/18* | (2020.01) |

(52) U.S. Cl.
CPC ........... *G06F 30/398* (2020.01); *G03F 1/36* (2013.01); *G03F 1/70* (2013.01); *G06F 30/30* (2020.01); *G06F 30/3953* (2020.01); *G06F 2119/18* (2020.01)

(58) Field of Classification Search
CPC ........ G06F 30/398; G06F 30/30; G06F 30/70; G06F 2119/18; G03F 1/36; G03F 1/70
See application file for complete search history.

(56) References Cited

U.S. PATENT DOCUMENTS

| | | | | |
|---|---|---|---|---|
| 5,737,580 | A * | 4/1998 | Hathaway | G06F 30/394 716/115 |
| 7,260,442 | B2 | 8/2007 | Hwang et al. | |
| 7,934,189 | B2 * | 4/2011 | Melzner | G06F 30/392 716/129 |
| 7,989,849 | B2 * | 8/2011 | Sherlekar | H01L 27/0207 257/207 |

(Continued)

*Primary Examiner* — Naum Levin
(74) *Attorney, Agent, or Firm* — Hauptman Ham, LLP

(57) ABSTRACT

A method for designing an integrated circuit includes steps of selecting a power rail of a cell, determining that a clearance distance for an electrical connection to or around the power rail is not sufficient to fit the electrical connection, selecting a power rail portion of the power rail for modification, and modifying a shape of the power rail portion to provide a clearance distance sufficient to fit the electrical connection. As clearance distances between features in an interconnection structure of an integrated circuit become smaller, manufacturing becomes more difficult and error-prone. Increasing clearance distances improves manufacturability of an integrated circuit. Modifying the shape of an integrated circuit power rail increases clearance distance to and/or around a power rail.

20 Claims, 9 Drawing Sheets

(56) References Cited

U.S. PATENT DOCUMENTS

| | | |
|---|---|---|
| 9,256,709 B2 | 2/2016 | Yu et al. |
| 9,767,240 B2 * | 9/2017 | Bickford .............. G06F 30/398 |
| 9,922,161 B2 * | 3/2018 | Kahng ................. G06F 30/398 |
| 10,147,714 B2 * | 12/2018 | Wang ................. H01L 27/0207 |
| 10,755,019 B2 * | 8/2020 | Trester ................ G06F 30/392 |
| 2007/0101303 A1 * | 5/2007 | Lien ..................... G06F 30/394 |
| | | 716/52 |
| 2009/0224356 A1 * | 9/2009 | Chandra ................ G06F 30/23 |
| | | 257/499 |
| 2014/0040838 A1 | 2/2014 | Liu et al. |
| 2015/0278429 A1 | 10/2015 | Chang |
| 2018/0102354 A1 * | 4/2018 | Wang ................. H01L 27/0207 |
| 2019/0236235 A1 * | 8/2019 | Trester ................ G06F 30/398 |
| 2020/0104445 A1 * | 4/2020 | Peng .................... G06F 30/398 |

\* cited by examiner

POWER RAIL WITH NON-LINEAR EDGE

PRIORITY CLAIM

The present application claims the priority of U.S. Provisional Application No. 62/753,234, filed Oct. 31, 2018, which is incorporated herein by reference in its entirety.

BACKGROUND

As integrated circuits become smaller, layouts for the integrated circuits are changed to decrease the overall area occupied by an integrated circuit. Decreasing the area of the layout is accomplished by substituting new structures for integrated circuit elements that are smaller than previous versions of integrated circuit elements. Decreasing the area of the layout is also accomplished by reducing the distance between circuit elements in a layer of an integrated circuit.

Smaller integrated circuits, and smaller integrated circuit elements, pose increasing difficulty in manufacturing processes because tolerances also become smaller. Thus, while electrical properties of some materials remain constant between generations of an integrated circuit, the manufacturing tolerances are increasingly difficult to satisfy because there is less room for error before an integrated circuit is negatively impacted by deviations from a manufacturing process flow.

DETAILED DESCRIPTION

Figure 1:
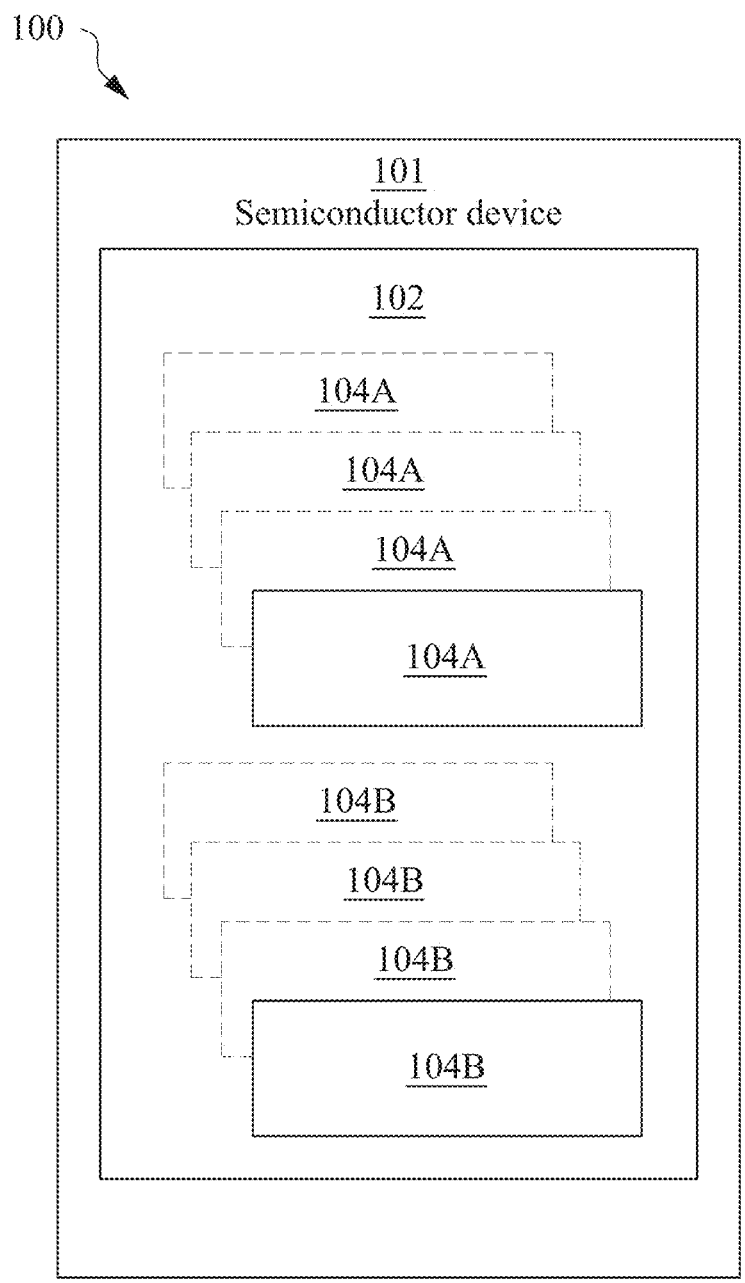
FIG. 1 is a diagram of a semiconductor device, in accordance with some embodiments.

The following disclosure provides many different embodiments, or examples, for implementing different features of the provided subject matter. Specific examples of components, values, operations, materials, arrangements, or the like, are described below to simplify the present disclosure. These are, of course, merely examples and are not intended to be limiting. Other components, values, operations, materials, arrangements, etc., are contemplated. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

In integrated circuit (IC) manufacturing, a device scaling process, or "shrink," occurs as smaller technology nodes are developed. An integrated circuit, or a layout thereof, is scaled from a first larger size to a second smaller size during a scaling or shrink process. Integrated circuits and IC layouts are scaled in order to fit more devices onto a substrate for increased performance in successive generations of semiconductor devices. Integrated circuits and IC layouts are scaled in order to decrease power consumption and to accommodate smaller dimensions of elements of the integrated circuit in a completed semiconductor device. Scaling or shrinking elements of an integrated circuit includes decreasing a height of cells (active areas) of the integrated circuit. A cell is a group of active devices and/or passive devices arranged to implement a designed function. In the present disclosure, the term "height" is used to refer to a dimension, in a first direction, of the cells and other elements of the integrated circuit. In the present disclosure, with regard to pieces of an element of an integrated circuit (e.g., a line, a transistor, and so forth), the term "length" refers to a largest dimension of the piece of the element, and the term "width" refers to a shortest dimension of the piece. With regard to pieces of an element of an integrated circuit, the term "height" is used with reference to a dimension of the feature in the first direction.

When shrinking the height of an integrated circuit cell, the pieces of elements in the cell also shrink in at least one dimension. Thus, a cell height shrink, in some embodiments, is accompanied by a decrease in line length for conductive lines extending in the first direction, and by a decrease in line width for conductive lines extending in a second direction, perpendicular the first direction, where the first and second directions are associated with lateral dimensions in a layer of the integrated circuit.

When shrinking conductive lines of an integrated circuit element, the clearance between pieces of the elements in the integrated circuit cell decreases. As clearance between pieces of an element of an integrated circuit cell decreases, reducing manufacturing variability in order preserve function of the elements of the integrated circuit cell becomes more difficult. When a manufacturing process deviates from an anticipated result, the performance of an element of an integrated circuit cell is more prone to deviating from a standard of circuit performance. Increasing the process window of manufacturing processes, or increasing the clearance between pieces of an element of an integrated circuit cell, increases the likelihood that an integrated circuit operates within a designed circuit performance.

One portion of an integrated circuit prone to deviation due to small clearances is between elements in different layers of an interconnect structure the integrated circuit. Conductive lines (or, metal lines) in one layer of an integrated circuit connect to conductive lines in another layer of an integrated circuit with vias or contacts. Vias or contacts that are too close to nearby circuit features are more prone to short circuits as insulating dielectric material between the vias and contacts, and the nearby circuit features, has an increased risk to break down when too thin. In some integrated circuits, interconnection structures become more complex to position vias and contacts at locations that have sufficient separation from nearby circuit features to avoid, or reduce a likelihood, of short circuits due to dielectric material breakdown. Interconnection structure complexity enlarges the space occupied by an integrated circuit layout, and increases the likelihood of a manufacturing defect causing the integrated circuit to not function as designed.

At least one embodiment of the present disclosure describes a method of reducing interconnection structure complexity, and to increase clearance between vias and contacts and nearby circuit features, and integrated circuits having a non-linear power rail for active areas of the integrated circuit. Modifications to power rails and conductive lines over the power rails are performed to increase clearance distances for vias and contacts and simplify interconnection structures. Modifications to power rails include changing the shape of a power rail, or a shape of a portion of a power rail (a power rail portion) selected for modification. Modification to conductive lines includes changing the shape of a conductive line, or the shape of a conductive line segment, selected for modification.

FIG. 1 is a block diagram of an integrated circuit 100 having a semiconductor device 101 in accordance with at least one embodiment of the present disclosure. In FIG. 1, semiconductor device 101 includes, among other things, a circuit macro (hereinafter, macro) 102. In some embodiments, macro 102 is a transistor macro. In some embodiments, macro 102 is a macro other than a transistor macro. Macro 102 includes, among other things, wire routing arrangements 104A and 104B. Examples of layout diagrams resulting in wire routing arrangement 104A include embodiments such as the routing arrangement layout diagrams in each of each of FIGS. 3, 4, 5, 6, and 7, where a power rail shape has been modified to create additional clearance distance for electrical connections to or from a source or drain (S/D) line. Examples of layout diagrams resulting in wire routing arrangement 104B include embodiments such as the routing arrangement layout diagrams in each of FIGS. 4, 5, 6, and 7, where a conductive line shape over a power rail has been modified to create additional clearance distance for electrical connections to or from a power rail from a conductive line over the modified conductive line. In some embodiments, multiple routing arrangement layouts 104A and 104B are in an integrated circuit to increase a process window for manufacturing an integrated circuit. In some embodiments, the routing arrangement layouts are a same type of routing arrangement layout (e.g., power rail layout modification or conductive line modification). In some embodiments, the routing arrangement layouts are different types of routing arrangement layout (e.g., power rail layout modification or conductive line modification).

Figure 2:
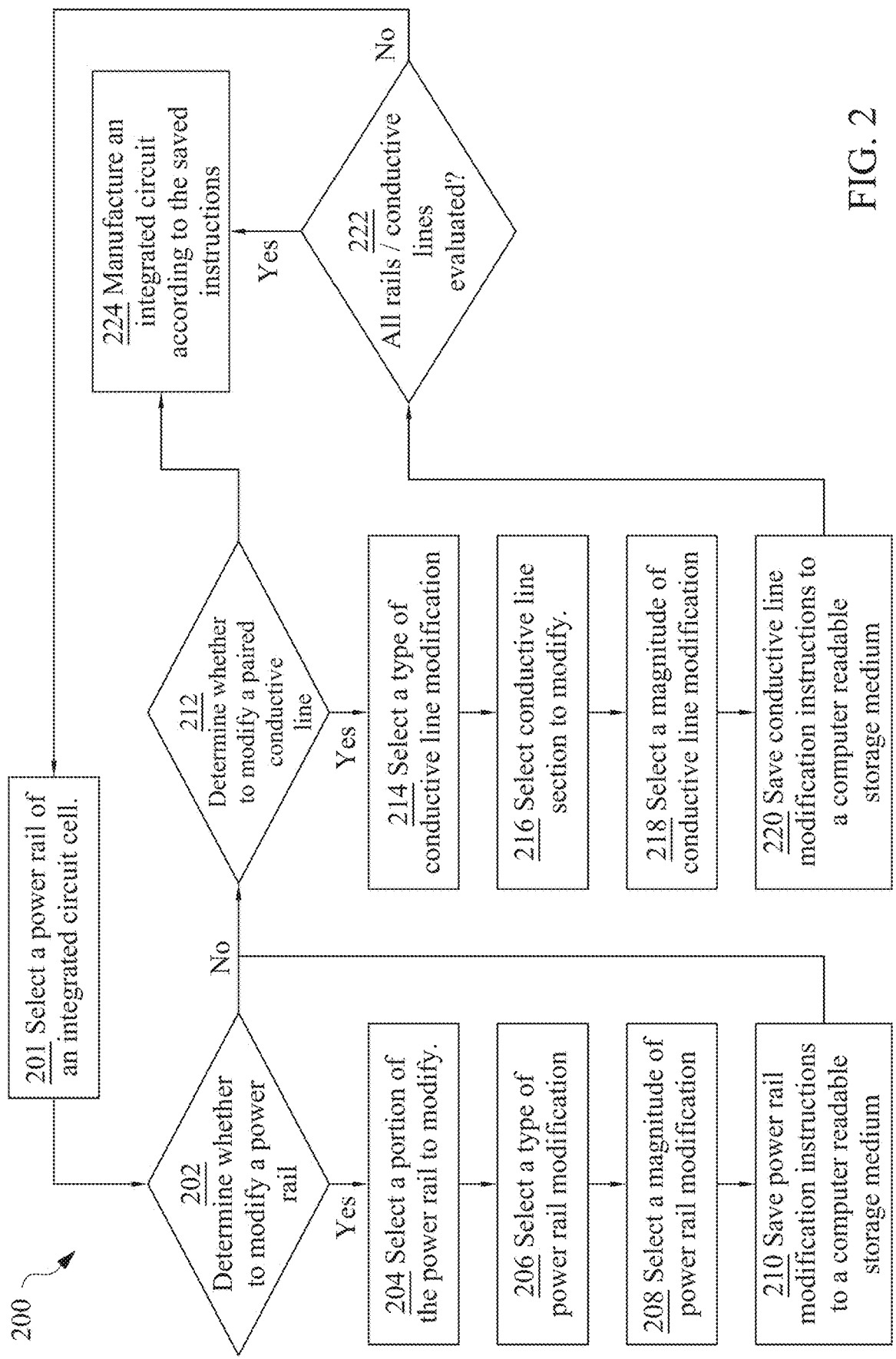
FIG. 2 is a flow diagram of a method of making an integrated circuit, in accordance with some embodiments.

FIG. 2 is a flow diagram of a method 200 of designing an integrated circuit, in accordance with some embodiments. An integrated circuit layout contains a plurality of cells and, in each cell of the plurality of cells, a plurality of power rails and conductive lines (e.g., first metal lines, or M1 lines). On a cell by cell basis, method 200 evaluates the integrated circuit for power rail and conductive line modifications, including nonlinearity (line offsets, single-side offsets, double-side offsets) and truncations or breaks (power rails) and combinations (in conductive lines), as described below in FIGS. 3-7. The operations of the method are presented in an order to promote clarity of the discussion. In some embodiments, the operations are conducted in the order presented below. In some embodiments, the operations are conducted in an order different from the order below. In some embodiments, some operations are omitted from the method while still accomplishing the objective of the present disclosure. In some embodiments, additional operations are included in the method.

In an operation 201, a power rail from a set of power rails in a cell of the integrated circuit is selected to determine whether to modify the selected power rail. In some embodiments, the power rail is selected by a designer. In some embodiments, a computer selects the power rails or prompts the designer to select the power rail.

In an operation 202, a determination is made whether to modify the selected power rail. In response to a determination to modify the selected power rail, the method proceeds to operation 204. In response to a determination to not modify the selected power rail, the method proceeds to operation 212.

Determining whether to modify a selected power rail includes determining a type of electrical connection the modification is designed to accommodate, and evaluating a clearance distance for the electrical connection. In some embodiments, the type of electrical connection to be accommodated is a via connection to the selected power rail from a conductive line at least two metal layers higher than the selected power rail in the integrated circuit. In some embodiments, the clearance distance for the electrical connection is a clearance between a contact or via and an edge of a conductive line at least one layer below the conductive line at least two metal layers higher than the selected power rail. When a clearance distance is too small to accommodate an electrical connection and preserve a margin of insulating material or dielectric material around the electrical connection, the integrated circuit becomes more prone to short circuits and loss of function. When an electrical connection is shrunk (e.g., the diameter or lateral dimensions of the electrical connection are reduced in order to maintain sufficient insulating material around the electrical connection), resistance of the electrical connection increases, making the integrated circuit operate more slowly, or with lower power efficiency. According to some embodiments, the clearance distance increase ranges from at least 10% to 100%, according to the different types of power rail and conductive line modifications described below.

In some embodiments, the type of electrical connection to be accommodated is a via connection between a conductive line at least one layer higher in the integrated circuit than the selected metal line, and a source or drain (S/D) line in a cell of the integrated circuit. The clearance distance evaluated is the space available for a contact or via to extend between the conductive line at least one layer higher in the integrated circuit than the selected metal line, and the source or drain line in the cell, bypassing the selected power rail.

In response to a clearance distance for a type of conductive line being too small to make an electrical connection that satisfies a design specification for the integrated circuit, for a first layout of the integrated circuit, a determination is made to modify the power rail.

Method 200 includes an operation 204, wherein a portion of a power rail of the cell is selected for modification. The selection of a portion of the power rail for modification includes a step of identifying a location of the electrical connection [1] to the power rail, or [2] bypassing the power rail, based on a location of the conductive lines in layers above the selected power rail in an integrated circuit layout. Selecting a portion of a power rail for modification includes a process of identifying a location of a transition point between the portion of a power rail that is to remain unmodified, and a portion of the power rail that is to undergo modification. A transition point in a cell is a position along the width (e.g., along the length of a power rail, or along the length of a conductive line such as a first metal line perpendicular to the gate electrode) at which the width of the power rail changes, or at which the conductive line changes, in a manner as described below. In some embodiments, the transition point is a position along the power rail at which the power rail narrows to provide additional space (e.g., greater clearance distance) for a contact or via to make an electrical connection with a source or drain line below the power rail. In some embodiments, the transition point is a position at which a conductive line is modified in order to provide additional space for a contact or via to make an electrical connection with the power rail below the conductive line. In some embodiments, the location of the transition point is at a center of the cell boundary along the power rail. In some embodiments, the location of the transition point is at a position along the power rail other than the center of the cell boundary.

Method 200 includes an operation 206, wherein a type of power rail modification is selected. Types of power rail modification include a full-linewidth offset of a power rail, a single-edge offset of a power rail (a single-edge offset), a double-edge offset of a power rail (a double-edge offset), and power rail truncation.

Figure 3:
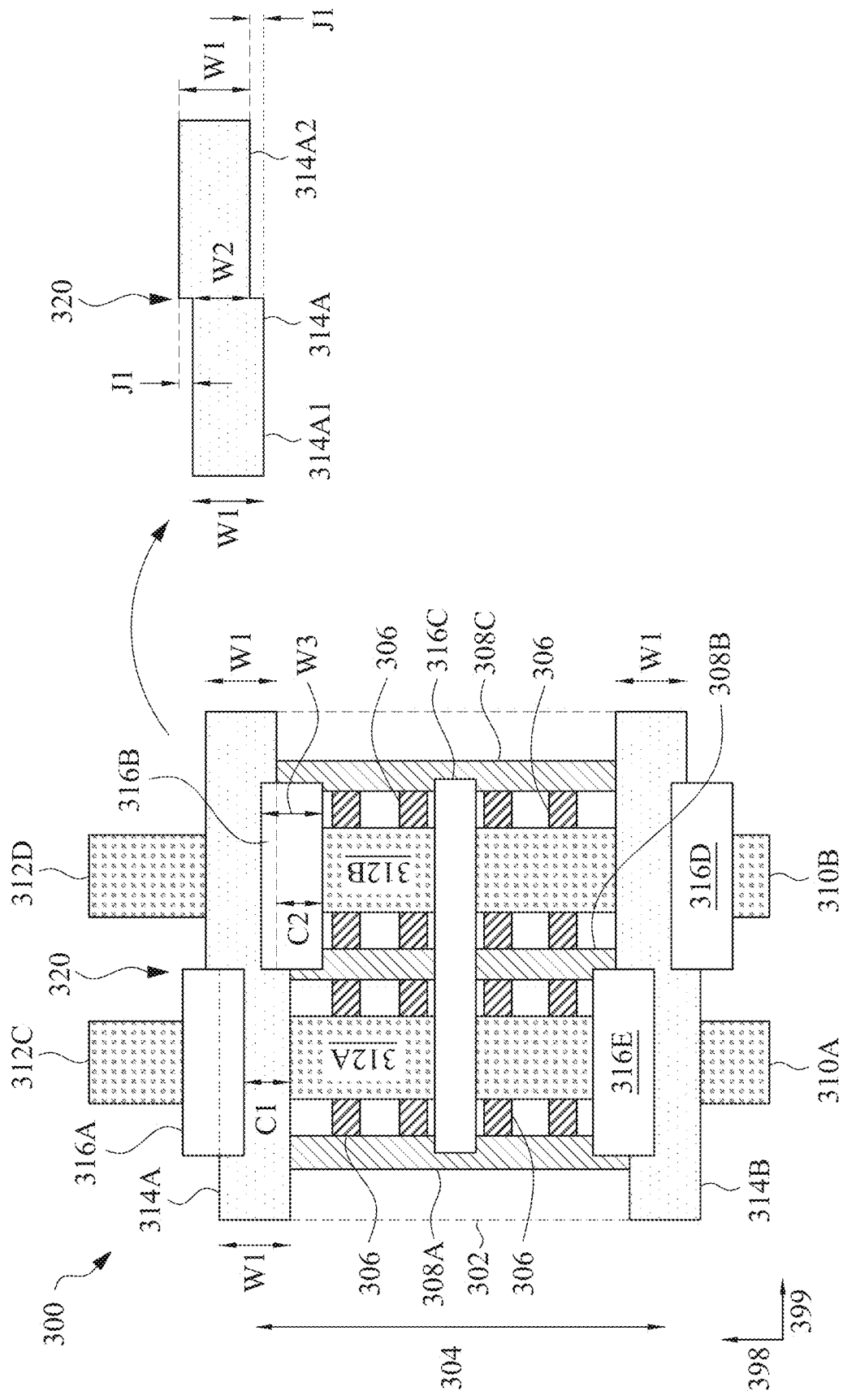
FIG. 3 is a top view of an integrated circuit, in accordance with some embodiments.

A full-linewidth offset of a power rail occurs when the power rail, at the modified portion of the power rail, retains an original power rail width, and an entirety of the power rail is shifted in a first direction perpendicular to the length of the power rail by a full-linewidth offset distance. The full-linewidth offset of the power rail shifts the modified portion of the power rail an equivalent amount, with respect to the unmodified portion of the power rail, on each side of the power rail. FIG. 3, below, describes a full-linewidth offset of the edges of a power rail, according to some embodiments of the present disclosure. In some embodiments, a full-linewidth offset of a power rail is selected during an integrated circuit design or layout operation to provide more clearance between the power rail and a source or drain line of the cell.

Figure 4:
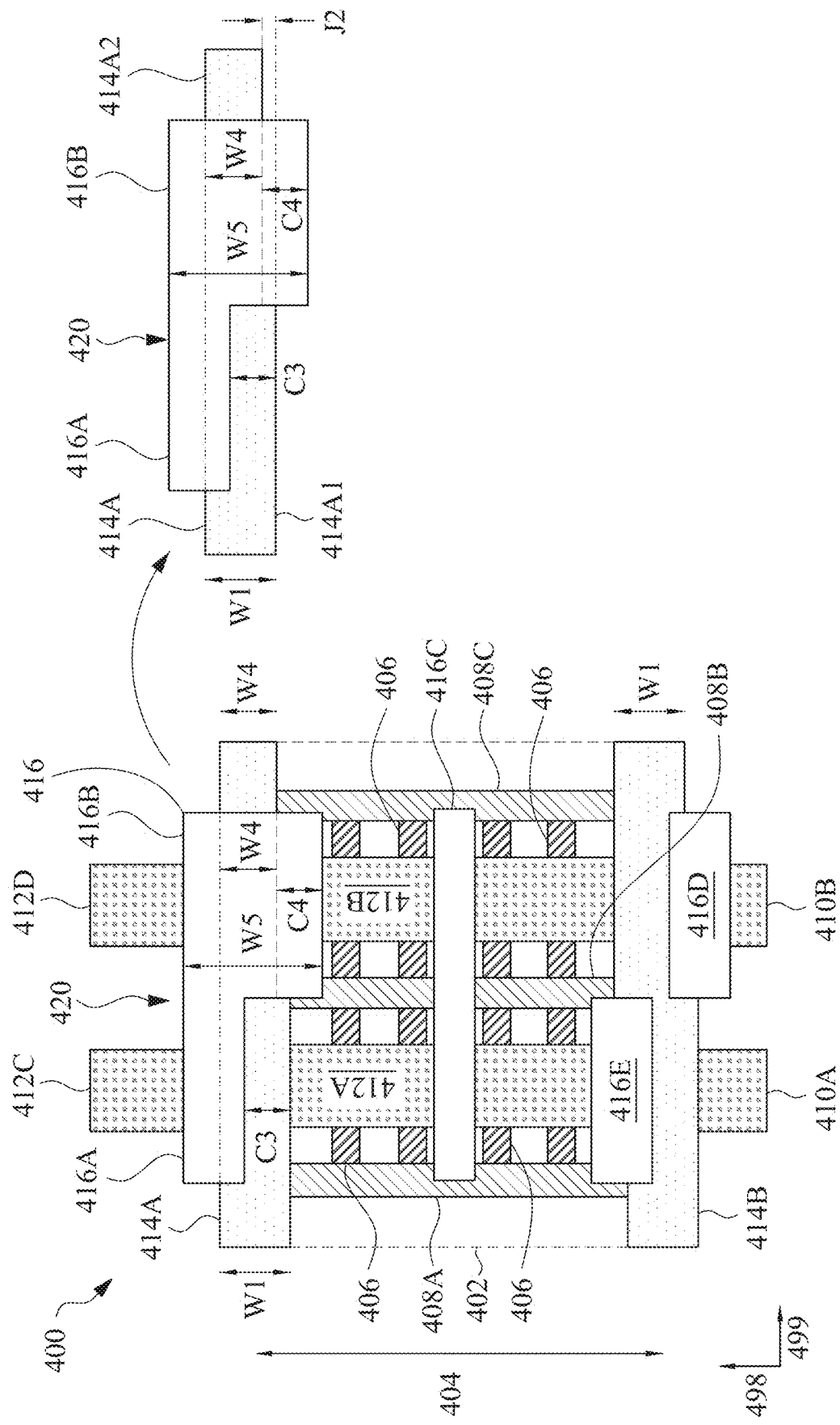
FIG. 4 is a top view of an integrated circuit, in accordance with some embodiments.

A single-edge offset type of modification to a power rail occurs when a power rail, having a portion which is to be modified, and a portion which is to remain unmodified, has one edge which remains linear for both the portion to be modified, and the portion to remain unmodified, while the opposite edge of the power rail is modified such that the edge becomes nonlinear (or, has a discontinuity or dislocation therein). The nonlinear edge of the power rail is formed by an inward offset (e.g., toward the center of the power rail) of the edge of the portion of the power rail to be modified. An inward offset has an inward offset distance. The unmodified edge of the selected power rail retains a continuous (or linear) edge along the length of the power rail in the cell, while the modified edge of the selected power becomes discontinuous, where the edges of each portion are linear for the portion, but the edges are not directly aligned to each other (e.g., at the position of the discontinuity, or dislocation, between the two portions of the edge). FIG. 4 describes a single-edge extension of a power rail, in accordance with some embodiments of the present disclosure. In some embodiments, a single-edge extension is selected to provide an increased clearance distance between a source or drain line and a conductive line at least one layer above the selected power rail for a contact or via in a single cell of the integrated circuit. In some embodiments, a single-edge offset of a power rail narrows the power rail at the modified portion. In some embodiments, the single-edge offset of a power rail broadens the power rail at the modified portion.

Figure 5:
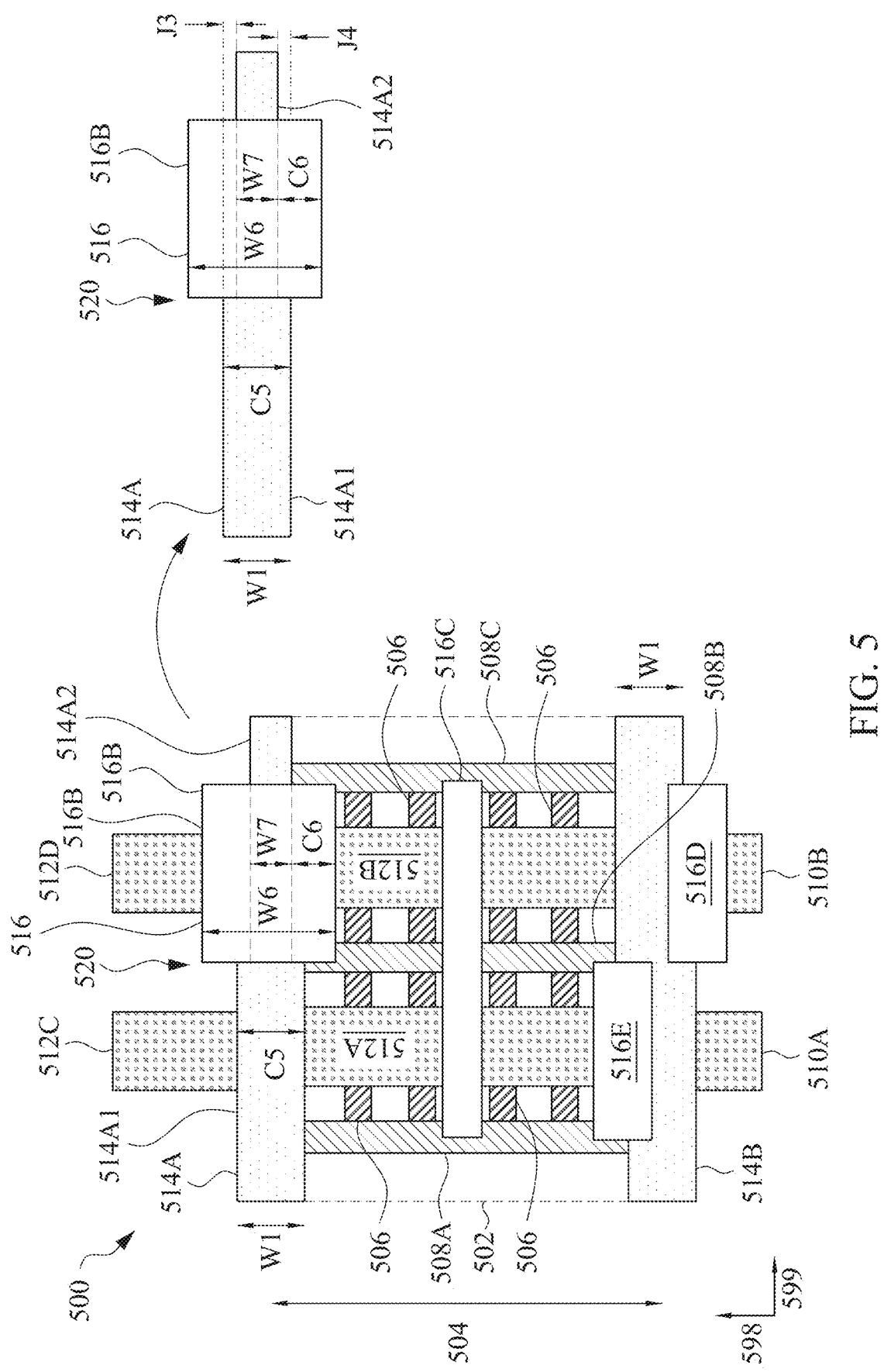
FIG. 5 is a top view of an integrated circuit, in accordance with some embodiments.

A double-edge offset type of modification to a power rail occurs when a power rail, having a portion which is to be modified, and a portion which is to remain unmodified, has both edges modified for the portion of the power rail which is to be modified. Thus, each edge of the power rail with a double-edge offset has an edge which is discontinuous (or, dislocated, or offset), as described above for the single-edge offset type of modification. FIG. 5, below, describes a double-edge offset of a power rail, in accordance with some embodiments of the present disclosure. In some embodiments, a double-edge offset is selected during a layout or design operation for an integrated circuit to provide an increased clearance distance between a source or drain line and a conductive line at least one layer above the selected power rail for a contact or via in neighboring cells of the integrated circuit at opposite edges of the selected power rail. In an embodiment, each power rail portion has a substantially straight inner edge and outer edge, and the offset of the inner and/or outer edges of power rails is the result of the substantially straight edges being separated from each other an "edge-offset" distance, while remaining substantially parallel to each other.

Figure 6:
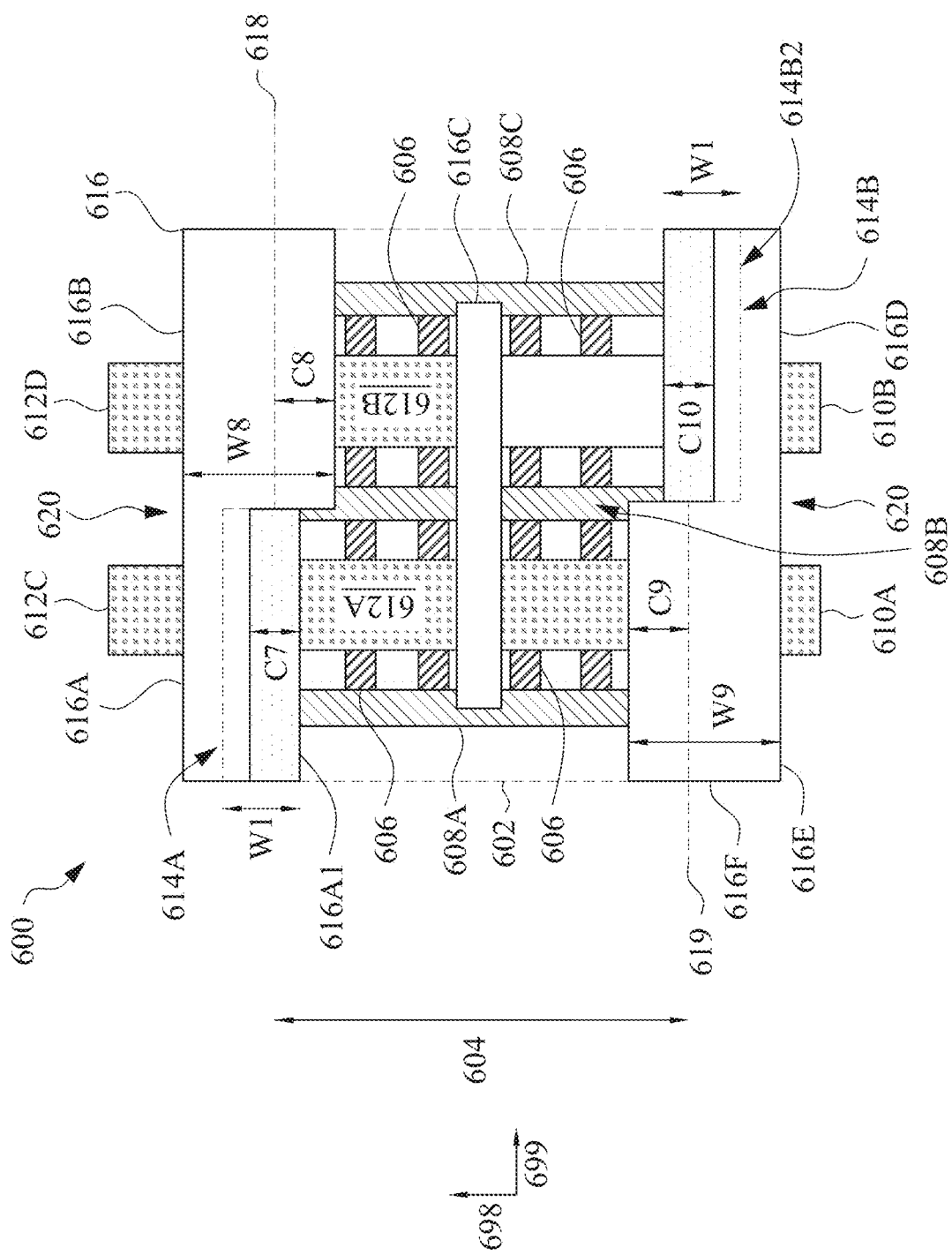
FIG. 6 is a top view of an integrated circuit, in accordance with some embodiments.
Figure 7:
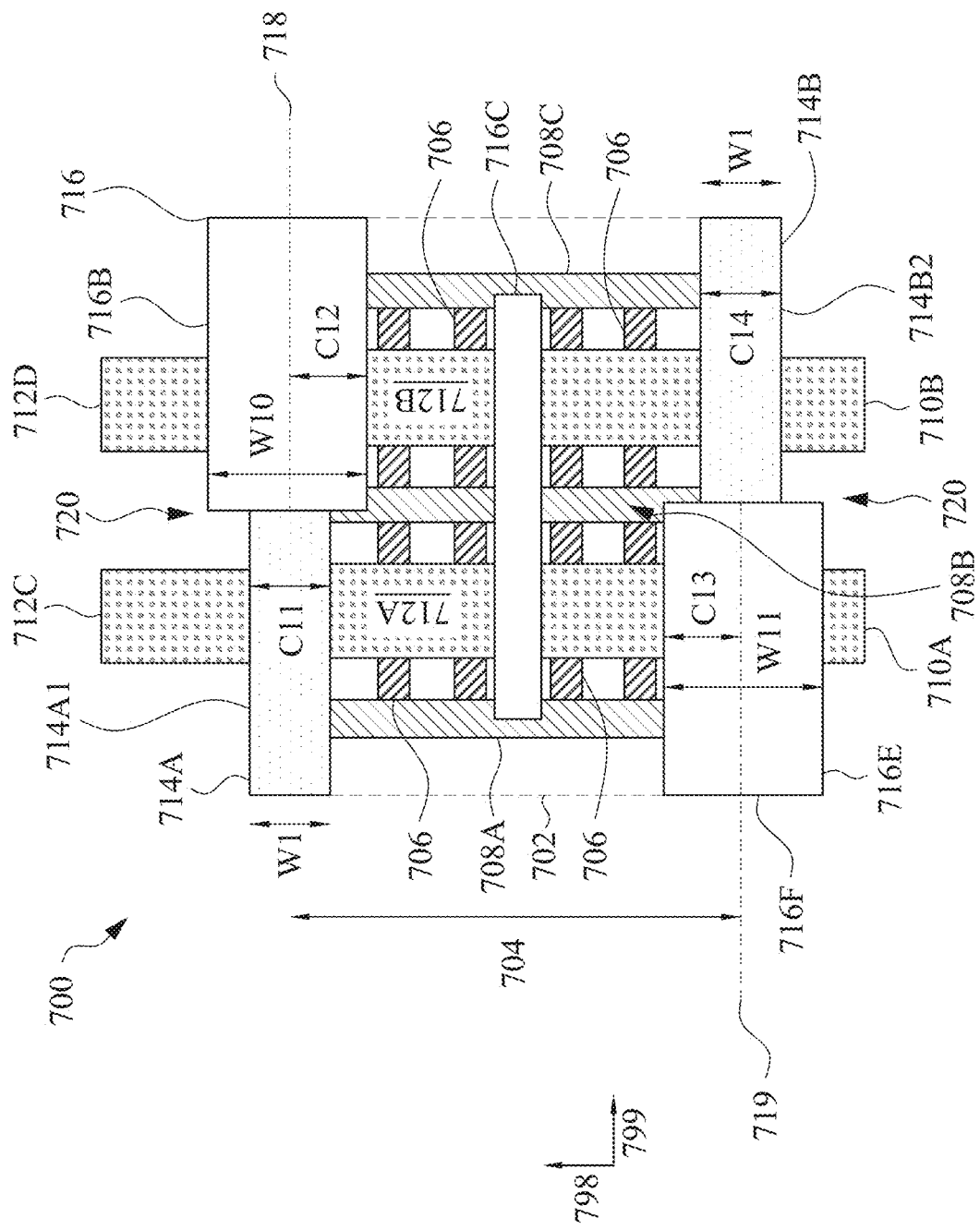
FIG. 7 is a top view of rails from integrated circuits, in accordance with some embodiments.

In some embodiments, a power rail truncation is described as the removal of a portion of a power rail (the portion to be modified) where the portion of a power rail which is not modified is left intact (or, unmodified) in the integrated circuit design or layout. In some embodiments, a power rail break, or power rail truncation, is selected during a layout or design operation for an integrated circuit if a portion of the power rail is removable without adversely impacting integrated circuit function. For example, a removable (or, redundant) portion of a power rail is a portion having a connection to other layers of the integrated circuit that serve a common function (e.g., $V_{dd}$ rail connection to ground at multiple locations, or $V_{ss}$ rail connection to a common voltage source). Power rail truncation provides a greatest amount of clearance distance (at the position of the portion of the power rail to be modified) for electrical connections between a source line or a drain line in a cell of the integrated circuit and a conductive line at least one layer above the power rail in the integrated circuit. FIG. 6 and FIG. 7 describe power rail truncation, according to some embodiments of the present disclosure.

In an operation 208, a magnitude of the modification of the selected power rail is selected. In some embodiments, the change in clearance distance accomplished by the modification of the selected power rail is a largest amount of clearance distance change without violating a design specification related to spacing between conductive lines of the integrated circuit. In some embodiments, the change in clearance distance accomplished by the modification of the selected power rail is an intermediate amount of clearance distance change, balancing a change in the dimensions of the contact to, or bypassing, the power rail, while narrowing the power rail as little as possible. Reducing power rail narrowing reduces resistance of the power rail in the integrated circuit and makes the power rail less susceptible to manufacturing defects such as etch block.

In an operation 210, instructions for making or adjusting an integrated circuit layout associated with the modification of the power rail, consistent with operations 204, 206, and 208 are saved to a computer-readable storage medium of an electronic design system (EDA system, see below) for a subsequent manufacturing process of the integrated circuit. In some embodiments, operation 210 is performed independently and separately form operation 220, below. In some embodiments, operation 210 is performed concurrently with operation 220.

In an operation 212, a conductive line paired with (e.g., directly over) the selected power rail is evaluated to determine whether to perform a conductive line modification, according to aspects of the present disclosure. According to some embodiments, a determination is made to modify a conductive line when the modification increases the clearance distance for receiving a via or contact connecting a power rail directly below the conductive line and a second conductive line at least one layer above the conductive line being evaluated for modification. According to some embodiments, a determination is made to modify a conductive line in response to the modification increasing the clearance distance between the conductive line being considered for modification, and a source line or a drain line in the cell below the conductive line. In response to a determination to modify a conductive line paired with a selected power rail, the method continues to operation 214. In response to a determination to not modify a conducive line paired with a selected power rail, the method continues to operation 224.

In operation 214, a type of conductive line modification is selected. Conductive line modification includes one or more of joining at least two conductive lines together over a cell, deleting a conductive line over a cell, and widening a conductive line over a cell. According to some embodiments, conductive line joining is selected to combine, at a different layer of the integrated circuit, the conductive paths that connect to a source or drain line, with a conductive line in a different cell of the integrated circuit, to reduce complexity of an interconnection structure over cells of the integrated circuit. Joining of conductive lines includes extending, in a direction along the length of the power rail, until at least two conductive lines directly over a selected power rail, so that the isolated conductive lines merge into a single conductive line with two conductive line sections on either side of the transition point of the cell. FIGS. 4 and 6 of the present disclosure describe embodiments wherein at least two conductive lines directly over a power rail of a cell are joined together.

According to some embodiments, conductive line deletion is selected to remove a portion of a conductive line directly over a selected power rail to make the full width of the power rail available for a via or contact between the selected power rail and a second conductive line at least two layers above the selected power rail in the integrated circuit. FIGS. 5 and 7 of the present disclosure describe embodiments wherein a conductive line is deleted.

According to some embodiments, a conductive line is selected for line widening in conjunction with line joining or line deletion, to further increase clearance distances for contacts. FIG. 7 describes a conductive line 716 which has undergone broadening on one side of a transition point 720, while the conductive line on the other side of the transition point has been deleted. Thus, both clearance distance C11 and C12 are increased from pre-modification dimensions.

FIGS. 6 and 7 describe conductive lines which have undergone line broadening, in accordance with some embodiments.

In operation 216, a conductive line section is selected for modification. In some embodiments, the conductive line section selected for modification is the section directly above a selected power rail portion which has been modified (e.g., by narrowing or deletion), to increase a clearance distance between the conductive line section and the source or drain line directly below the conductive line section. (See, e.g., FIG. 7, conductive line 716). Selection of the conductive line segment for modification is, therefore, based in part on the determination of which power rail portion is to be modified in operation 204, above. In some embodiments, a conductive line section is selected for modification when the power rail portion directly below the selected power line portion is a modified power rail portion.

In operation 218, a magnitude of the conductive line modification is selected. Conductive line modification occurs with dimensional increments ranging from zero (or, no modification) up to a dimension corresponding to the full width of the space available in a layout, keeping inter-device separation limits in place (e.g., separation limits between a conductive line and a via, to avoid short circuits or dielectric breakdown, and so forth). In some embodiments, the amount of conductive line modification selected is the smallest amount that will allow a via or contact to make an electrical connection to, or around, the conductive line in the integrated circuit.

In an operation 220, instructions for making or adjusting an integrated circuit layout associated with the modification of the conductive line segment, consistent with operations 214, 216, and 218, are saved to a computer-readable storage medium of an electronic design system (EDA, see below) for a subsequent manufacturing process of the integrated circuit. In some embodiments, operation 220 is performed independently and separately form operation 210, above. In some embodiments, operation 220 is performed concurrent with operation 210 (e.g., after completion of operations 204, 206, and 208, and 214, 216, and 218 are performed).

In an operation 222, a determination is made as to whether all the power rails and/or conductive lines of an integrated circuit cell have been analyzed for power rail and conductive line modification. In response to a determination that not all of the power rails or conductive lines of an integrated circuit cell have been analyzed for power rail and conductive line modification, the method moves to operation 201. In response to a determination that all of the power rails or conductive lines of an integrated circuit cell have been analyzed for power rail and conductive line modification, the method moves to operation 224.

In an operation 224, the integrated circuit is manufactured in accordance with the instructions saved in operation 210 and/or operation 220, using techniques described hereinbelow FIG. 3 is a top view of an integrated circuit 300, in accordance with some embodiments. Integrated circuit 300 has a cell 302 having a cell height 304. A power rail 314A is at a top end of cell 302, and a power rail 314B is at a bottom end of cell 302. Integrated circuit 300 includes active areas 306, which, in some embodiments, contain fins for transistors of the circuit, and poly lines perpendicular to the fins of the active areas 306. Poly lines extend along the first direction 398 of the cell 302, and fins in active areas 306 of the cell 302 extend along the second direction 399. Poly lines 308A and 308C are edge poly lines closest to edges of the cell 302, and poly line 308B is a center poly line, between the edge poly lines 308A and 308C. In integrated circuit 300, poly line 308B is a gate electrode for cell 302. Fins of active areas 306 are formed at a lowest layer of cell 302. Poly lines 308A-C are formed in a layer over fins of active areas 306, i.e., farther from a substrate. Conductive lines 310A and 310B are over fins of active areas 306. In some embodiments, conductive lines 310A and 310B are in a same layer as poly lines 308A-308C of the integrated circuit. In some embodiments, the conductive lines 310A and 310B are in direct contact with fins of active areas 306. In some embodiments, conductive line 310A electrically connects to the source and conductive line 310B electrically connects to the drain. In some embodiments, conductive line 310A electrically connects to the drain and conductive line 310B electrically connects to the source. According to some embodiments, conductive line 310A and conductive line 310B electrically connect to the source at the same time. In a non-limiting embodiment of an integrated circuit wherein the conductive lines electrically connect to the source at the same time, a series NMOS integrated circuit structure, or a NAND gate, has conductive lines electrically connected to a same source connection in the integrated circuit structure. According to some embodiments, conductive line 310A and conductive line 310B electrically connect to the drain at the same time.

Conductive line 310A makes electrical connection to one of conductive lines 314A and 314B, and conductive line 310B makes electrical connection to the other of conductive lines 314A-B. In integrated circuit 300, conductive line 310A is cut below, in the first direction 398, first power rail 314A into two segments. Conductive line 310A includes, a first source segment 312A in cell 302 and a drain segment 312C in a cell adjacent to the cell 302. Conductive line 310B includes a first drain segment 312B in cell 302 and a source segment 312D in the cell adjacent to cell 302. A first source segment 312A is below the first power rail 314A and extends in the first direction 398. Drain segment 312C in the cell adjacent to cell 302 does not overlap with power rail 314A. Source segment 312D in the cell adjacent to cell 302 does overlap with power rail 314A. In some embodiments, first power rail 314A is a $V_{ss}$ line.

Power rail 314A and power rail 314B are in a layer of integrated circuit 300 over the layer having conductive lines 310A and 310B. Power rail 314B is a straight power rail, where the edge of the power rail within the cell 302 and the edge of the power rail outside the cell 302 are both substantially straight, with no offsets or nonlinearities. Power rail 314A is a non-linear power rail, where, at a transition point 320 (e.g., an offset location), a first portion 314A1 and a second portion 314A2 meet. Transition point 320 is at a center of cell 302 along the second direction 399. In some embodiments, the transition is at a position along the second direction 399 other than the center of the cell.

First portion 314A1 and second portion 314A2 have linear edges, as described above for the power rail 314B. Boundaries of the first portion 314A1 are misaligned with boundaries of the second portion 314A2 in the first direction 398. First portion 314A1 has a first width W1, and second portion 314A2 has the first width W1, and power rail 314B has the first width W1. At the transition point 320 between first portion 314A1 and second portion 314A2, power rail 314A has a second width W2, smaller than W1. Second width W2 is a transition point width, or, a width that is configured to avoid electromigration of material in the first power rail as current flows through the rail. When the transition point width (W2, or the width of the power rail at the transition point 320) is too small, electromigration of material of the power rail becomes more likely, leading to increased chances for device failure. Second portion 314A2 is shifted, in the first direction 398 by a first shift (e.g., "offset") amount J1.

Conductive lines 316A-316E are in a layer of the integrated circuit over the layer having power rail 314A and power rail 314B. A first clearance amount C1 corresponds to an amount of space, in the first direction 398, between an edge of the power rail 314A (or, more specifically, first portion 314A1) closest to a center (e.g., an inner edge) of the cell 302, and the edge of conductive line 316A closest to the center of the cell 302. In the present disclosure, when referencing edges of a feature (conductive line, and so forth) of a cell of an integrated circuit, the edge of the feature closer to the center of the cell is the "inner edge," and the edge of the feature farther from the center of the cell is the "outer edge" of the feature. First clearance amount C1 is a distance or an amount of space available for a via to connect to first power rail 314A above first source segment 312A around conductive line 316A. Second clearance amount C2 is a distance or an amount of space available for a via to connect conductive line 316B to first drain segment 312B. Width W3 is a line width of conductive line 316B in the first direction 398. By shifting second portion 314A2 from first portion 314A1, second clearance C2 increases with respect to a clearance between the inner edge of a linear power rail without reducing the second clearance C1 for the cell area 302. Width W3 is larger than second clearance C2 because part of conductive line 316B is directly over first power rail 314A (specifically, over second portion 314A2).

As clearance for vias between layers of an integrated circuit increases for cells having non-linear power rails, as compared to clearance for vias between layers of an integrated circuit having linear power rails, the complexity of an interconnection structure layout decreases. Reduced complexity is associated with reduced area associated with the interconnection structure layout, reduced manufacturing complexity or vulnerability (e.g., to defects or process variation in a manufacturing process), and greater scaling amounts for integrated circuit layouts because of greater clearance between features of the interconnection structure. As the area for an interconnection structure decreases, the total integrated circuit area is reduced and more devices are fit onto a manufacturing substrate during a manufacturing process.

According to some embodiments of integrated circuits described herein, fins of a cell of an integrated circuit are formed by etching a plurality of lines into a semiconductor substrate material to form arrays of parallel ridges (fins) of the semiconductor substrate material. According to some embodiments, semiconductor material suitable for fins includes intrinsic silicon, doped silicon, silicon germanium (SiGe), binary type IV semiconductor materials, gallium arsenide (GaAs), binary type III-V semiconductor materials, and so forth. In some embodiments, semiconductor substrate material is formed by cooling molten material into solid ingots, and cutting the ingots to make a bulk integrated circuit substrate material. In some embodiments, a bulk semiconductor material substrate is cut from an ingot, a layer of dielectric material (e.g., silicon dioxide) is deposited onto the bulk semiconductor material, and a layer of device semiconductor substrate material is deposited into wells etched into the dielectric material to form a silicon on insulator (SOI)-type semiconductor substrate for forming fins of the integrated circuit. Silicon dioxide or other insulating dielectric materials are deposited onto a surface of the bulk semiconductor substrate material using e.g., atomic layer deposition (ALD), chemical vapor deposition (CVD), and so forth.

In some embodiments, active areas of an integrated circuit are formed by etching isolation trenches into a semiconductor substrate material to isolate fins in one active area from fins in an adjoining active area. In some embodiments, isolation trenches are subsequently filled with an insulating material such as silicon dioxide or other suitable dielectric material for isolating individual active areas in cells of an integrated circuit. According to some embodiments, portions of fins are doped with N-type or P-type dopants to form channels for transistors in the integrated circuit. In some embodiments, isolation trenches are filled once the processes of fin etching and doping are complete. In some embodiments, isolation trenches are filled after fin etching is complete, but before fin doping has been performed. In some embodiments, the isolation trenches and inter-fin spaces are filled with dielectric material, and the dielectric material is etched back to expose an upper portion of fins in the array of fins of the semiconductor substrate material. In some embodiments, only an exposed upper portion of fins in the array of fins are doped with N-type or P-type dopants to make channels for transistors, to reduce leakage current between fins in a single cell of the integrated circuit, or to reduce leakage of current between cells of the integrated circuit.

Conductive lines are metal lines of an interconnection structure of the integrated circuit. Conductive lines extend in the first direction and the second direction in order to connect elements of transistors, such as source line 412A, and drain line 412B, to other portions of the integrated circuit. In some embodiments, the conductive lines are polysilicon (poly) lines deposited in a blanket film, the poly lines being etched from the blanket film to produce parallel rows of material within cells of the integrated circuit for source or drain connections to the fin on either side of the channel region. In some embodiments, the conductive lines include both source and drain lines, and gate electrode lines directly over the channel regions of cells. In some embodiments, source and drain lines have a first dimension (width) in the second direction (see, e.g., second direction 399) and the gate electrode has a second dimension (width) in the second direction. In some embodiments, the second dimension (e.g., the width of the gate electrode) is comparable to, or slightly greater than, the channel width of the channel region in the fins below the gate electrode.

In some embodiments, power rails extend across a cell along the second direction and have a rail width in the first direction (see, e.g., first direction 398). In some embodiments, power rails are formed from polysilicon or a conductive metal such as titanium (Ti), tungsten (W), aluminum (Al), platinum (Pt), and so forth, and alloys thereof. According to some embodiments, conductive metals for power rails are deposited onto a wafer by sputtering a target having the metal composition of the power rail. In some embodiments, polysilicon for power rails is deposited onto a substrate by depositing a blanket layer of polysilicon, and etching the blanket layer of polysilicon to isolate individual conductive lines at top and bottom ends of the cells of the integrated circuit.

Conductive lines extend across and over cells of integrated circuit in order to connect the source, drain, gate electrode, and power rails of a cell to the interconnection structure of the integrated circuit. Conductive lines, such as first metal lines, or M1 lines, are trench-like structures that extend in the first or the second direction. Conductive lines such as first metal lines are formed in a layer of interlayer dielectric (ILD) material having trenches etched therein by sputtering the metal for the conductive lines into the trenches and onto a top surface of the ILD material. Individual metal lines are isolated by performing a chemical mechanical polishing (CMP) process on the metal on the top surface of the ILD material, leaving the isolated metal trench segments, or metal lines, embedded in the ILD material.

FIG. 4 is a top view of an integrated circuit 400, in accordance with some embodiments. Elements of FIG. 4 similar to elements of FIG. 3 have an identifying numeral incremented by 100 from the identifying numeral of the corresponding element of FIG. 3. In FIG. 4, first power rail 414A includes a first portion 414A1 and a second portion 414A2. First portion 414A1 and second portion 414A2 meet at transition point 420. Conductive line 416 is a combined conductive line, and includes a first conductive line segment 416A and a second conductive line segment 416B. Transition point 420 indicates a transition from first conductive line segment 416A and second conductive line segment 416B. Transition point 420 is aligned, in the first direction 498, with poly line 408B. Poly line 408B is a gate electrode for cell 402. In some embodiments, the transition point between the first portion and the second portion of a power rail is not aligned with the gate electrode. In some embodiments, the transition between the first conductive line segment and the second conductive line segment is not aligned with the gate electrode.

First power rail 416A has an offset inner edge along second portion 414A2 and an unmodified inner edge along first portion 414A1. The outer edge of the first power rail 414A is substantially linear across both first portion 414A1 and second portion 414A2 of the first power rail. The inner edge of the second portion 414A2 of first power rail 414A is offset by an offset distance J2 in the first direction 498 away from the center of cell 402. The first portion 414A1 of the first power rail 414A has a first width W1 and the second portion 414A2 of the first power rail 414A has a fourth width W4, smaller than the first width W1. An offset distance J2 is the amount that the inner edge of second portion 414A2 is offset away from the center of cell 402. The sum of the offset distance J2 and the fourth width W4 is equal to the first width W1. Dashed lines at the interior of conductive line 416 indicate the positions of edges of power rail 414A in a layer of the integrated circuit below conductive line 416.

A clearance distance C3 between the inner edge of first portion 414A1 and the inner edge of first conductive line segment 416A. Clearance distance C3 is unaffected by the offset of the inner edge of second portion 414A2 of power rail 414A. Width W5 is the width of second conductive line segment 416B above second portion 414A2 of power rail 414A. Clearance distance C4 extends from the inner edge of second portion 414A2 of the first power rail 414A to the inner edge of second conductive line segment 416B. Clearance distance C4 is the amount of space available for a via to connect between conductive line 416 and second drain line 412B. The offset in power rail 414A is on the drain side of the cell 402. In some embodiments, the offset in a power rail is on the source side of the rail. Power rail 414B is an unmodified, or linear-sided power rail. In some embodiments, only one power rail is modified to have a non-linear edge. In some embodiments, both power rails of a cell are modified to have non-linear edges. In some embodiments, a power rail is modified with an offset or offset in a single cell of the length of the power rail. In some embodiments, a power rail is modified with offsets at multiple locations along a length of the cell.

According to some embodiments, a cell contains a combined conductive line such as conductive line 416 when to promote pattern uniformity. Increased pattern uniformity provides improved feature uniformity during etch processes used to form trenches for conductive lines. In some embodiments, pattern uniformity also improves chemical mechanical polishing (CMP) performance during a manufacturing process by reducing dishing. Improved pattern uniformity during a CMP operation provides a more level surface for subsequent film deposition and photolithography, reducing feature non-uniformity due to focusing issues during manufacturing of the interconnection structure of the integrated circuit.

FIG. 5 is a top view of an integrated circuit 500, in accordance with some embodiments. Elements of FIG. 5 similar to the elements of FIG. 3 have a same identifying numeral, increased by 200. First power rail 514A is an offset power rail, where first portion 514A1 is an unmodified portion of first power rail 514A, having a first width W1, and second portion 514A2 of first power rail 514A is a modified portion, having a seventh width W7 smaller than W1. Second portion 514A2 has been offset at an inner edge, away from the center of cell 502, decreasing the width of the second portion 514A2. Second portion 514A2 has also been offset at an outer edge, toward the center of cell 502, again decreasing the width of the second portion 514A2.

Conductive line 516 is a truncated conductive line, having only a second conductive line segment 516B, and no first conductive line segment 516A. Conductive line 516 (or, second conductive line segment 516B), has a line width W6 larger than seventh W7. In some embodiments, when a power rail portion, such as second portion 514A2 (or second portion 414A2, above) is offset at an inner edge, or offset away from a center of a cell, the conductive line directly above the offset is widened to further increase clearance for a via extending from the conductive line segment to the source or drain line in the cell below the conductive line segment. Thus, clearance distance C6 is modified a result of both the offset of the inner edge of second portion 514A2 and any increase of the sixth width W6 for second conductive line segment 516B. In second conductive line segment 516B, dashed lines indicate a location of edges of first power rail 514A directly below second conductive line segment 516B.

J3 is an offset distance of the outer edge of second portion 514A2, and J4 is an offset distance of the inner edge of second portion 514A2. The sum of J3, J4, and W7 equals the first width W1. In some embodiments, W6 is the same distance as W1. In some embodiments, W6 is larger than W1. According to some embodiments, one edge of a power rail is offset inward to improve a clearance distance in a first cell, but not an adjoining cell on the other side of the power rail. In some embodiments, a power rail has been modified by a full-linewidth offset, rather than a single-edge offset to increase clearance distance for a via connection in a first cell on one side of the power rail, but not the cell on an opposite side of the power rail at the location of the offset. In some embodiments, a power rail has been modified by a double-edge offset improve clearance distance in cells at both sides of the power rail at the position of the double-edge offset in the power rail along the second direction (e.g., second direction 599).

Each of FIGS. 3, 4, and 5 are top views of some embodiments of an integrated circuit having only one power rail with a non-linear edge (e.g., where at least one side of the power rail is not aligned with at the two portions on opposite sides of a transition point on the power rail). FIGS. 6 and 7, below are top views of integrated circuits having two power rails with non-linear edges, according to some embodiments.

FIG. 6 is a top view of an integrated circuit 600, in accordance with some embodiments. Elements of FIG. 6 similar to the elements of FIG. 3 have a same identifying numeral, increased by 300. In FIG. 6, power rail 614A is a modified power rail. Power rail 614A has only a first portion 614A1, and no second portion beyond transition point 620 and the far edge of cell 602 in the second direction 699. Power rail 614B resembles power rail 614A, being a modified power rail. Power rail 614B is a truncated power rail, having only second portion 614B2 (closest to the edge of cell 602 beyond transition point 620), and no first portion.

In some embodiments, one power rail for a cell has one discontinuity, or break, where the power rail is truncated to provide additional clearance for a via from a metal line above an integrated circuit cell to a source or drain line of the cell. In some embodiments, both power rails for a cell have a discontinuity, or break, in the power rails to allow for clearance to the source or drain lines of the integrated circuit. In an embodiment, a first power rail of the cell has a discontinuity directly over one of the source or drain line of the cell, and a power rail of the cell has a discontinuity directly over the other of the source or drain line of the cell.

In embodiments of cells of an integrated circuit having a truncation or break in the at least one power rail, the clearance distance for a via connecting a metal line directly over a source or drain line of the cell corresponds to the width of the conductive line over the source or drain line within the cell of the integrated circuit. For example, cell 602 has an upper boundary 618 directly under the middle of power rail 614A and conductive line 616. A via (not shown) from a conductive line (not shown) directly over power rail 614A and conductive line 616 fits within clearance distance C7, which extends beyond upper boundary 618 from the center of cell 602. A via (not shown) from conductive line 616B to first drain segment 612B fits within clearance distance C8 between the inner edge of second conductive line segment 616B and upper boundary 618.

Cell 602 has a lower boundary 619 directly under the middle of power rail 614B and conductive line segments 616D-E. A via (not shown) from a conductive line (not shown) directly over power rail 614B and conductive line segment 616D fits within clearance distance C10, which extends beyond upper boundary 618 from the center of cell 602. A via (not shown) from conductive line segment 616E to first source segment 612A fits within clearance distance C9 between the inner edge of conductive line segment 616E and lower boundary 619.

Conductive line 616 is a composite conductive line, where first conductive line segment 616A directly connects with second conductive line segment 616B at transition point 620. At a bottom of cell 602, at lower boundary 619, conductive line segment 616D and conductive line 616E meet at transition point 620, forming a conductive line 616F. Conductive line 616F, directly over second power rail 614B (or, directly over second portion 614B2) is continuous across cell 602 along the second direction 699. In some embodiments, a conductive line has a wide portion on one side of the conductive line transition point, and a narrow portion on the other side of the conductive line transition point, wherein the wide portion does not overlap the below-situated conductive line. In some embodiments, a conductive line has a wide portion on one side of the conductive line transition point, and a narrow portion on the other side of the conductive line transition point, wherein part of the wide portion and part of the narrow portion both overlap the below-situated conductive line.

FIG. 7 is a top view of an integrated circuit 700, in accordance with some embodiments. Elements of FIG. 7 similar to elements of FIG. 6 have a same identifying numeral, increased by 100. In FIG. 7, power rail 714A and power rail 714B are truncated power rails, as described previously in FIG. 6 (see, e.g., power rail 614A and power rail 614B). Conductive line 716 is a truncated conductive line, having only a conductive line segment on a far side, in the second direction 799, of transition point 720. Conductive line 716F is a truncated conductive line, having only a conductive line segment 716E on a near side, in the second direction 799, of transition point 720. At upper boundary 718, the power rail 714A (or, the power rail portion 714A1) and conductive line 716 are at opposite sides of transition point. At lower boundary 719, the power rail 714B (or, power rail portion 714B2) and the conductive line 716F are at opposite sides of transition point 720. At a near side of the transition point 720, cell 702 has one power rail portion (see 714A1) and one conductive line segment (716E), and at a far side of the transition point 720, cell 702 has one power rail portion (see 714B2) and one conductive line segment (see 716B). Cell 702 has an upper boundary 718 directly under the middle of power rail 714A and conductive line 716. A via (not shown) from a conductive line (not shown) directly over power rail 714A fits within clearance distance C11, which extends across the entire width of power rail 714A. The clearance distance C11 extends across the entire width of power rail 714A because conductive line 716 is a truncated conductive line and does not extend directly above power rail 714A. A via (not shown) from conductive line 716B to first drain segment 712B fits within clearance distance C12 between the inner edge of conductive line segment 716B and upper boundary 718.

Cell 702 has a lower boundary 719 directly under the middle of power rail 714B (or, power rail portion 714B2) and conductive line segment 716E. A via (not shown) from a conductive line (not shown) directly over power rail portion 714B2, and down to power rail portion 714B2, fits within clearance distance C14, which extends across an entirety of the width of the power rail portion 714B2 in the first direction 798. Clearance distance C14 extends across an entirety of the width of the power rail portion 714B2 in the first direction 798 because there is no conductive line (at the same level as conductive line 716F) directly over power rail portion 714B2. A via (not shown) from conductive line segment 716E to first source segment 712A fits within clearance distance C13 between the inner edge of conductive line segment 716E and lower boundary 719.

Figure 8:
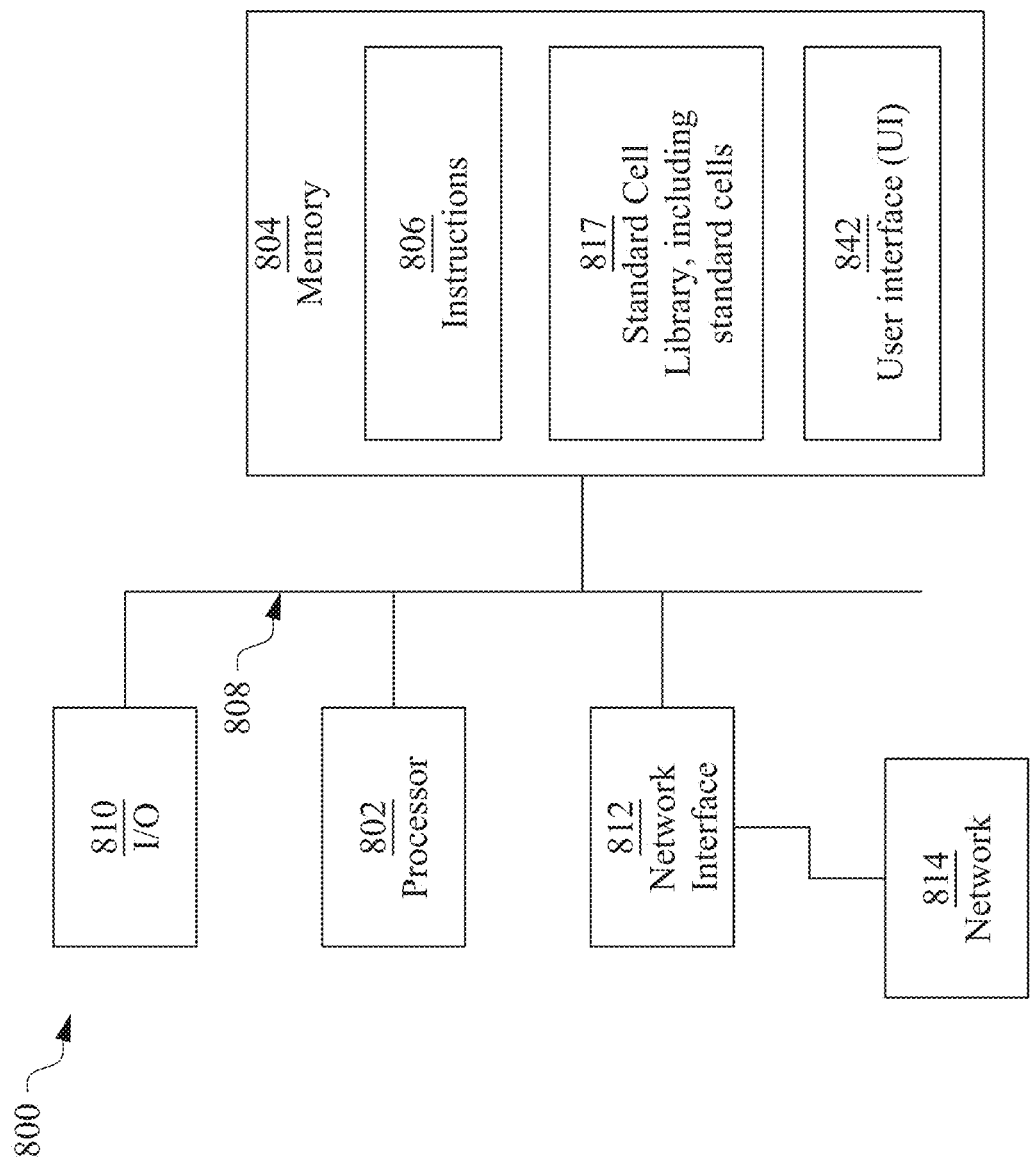
FIG. 8 is a block diagram of an electronic design automation (EDA) system, in accordance with some embodiments.

FIG. 8 is a block diagram of an EDA system, in accordance with some embodiments. Methods described herein of designing layout diagrams represent wire routing arrangements, in accordance with one or more embodiments, are implementable, for example, using EDA system 800, in accordance with some embodiments.

In some embodiments, EDA system 800 is a general purpose computing device including a hardware processor 802 and a non-transitory, computer-readable storage medium 804. Storage medium 804, amongst other things, is encoded with, i.e., stores, computer program code 806, (e.g., a set of executable instructions). Execution of instructions 806 by hardware processor 802 represents (at least in part) an EDA tool which implements a portion or all of the methods described herein in accordance with one or more (hereinafter, the noted processes and/or methods).

Processor 802 is electrically coupled to computer-readable storage medium 804 via a bus 808. Processor 802 is also electrically coupled to an I/O interface 810 by bus 808. A network interface 812 is also electrically connected to processor 802 via bus 808. Network interface 812 is connected to a network 814, so that processor 802 and computer-readable storage medium 804 are capable of connecting to external elements via network 814. Processor 802 is configured to execute computer program code 806 encoded in computer-readable storage medium 804 to cause EDA system 800 to be usable for performing a portion or all of the noted processes and/or methods. In one or more embodiments, processor 802 is a central processing unit (CPU), a multi-processor, a distributed processing system, an application specific integrated circuit (ASIC), and/or a suitable processing unit.

In one or more embodiments, computer-readable storage medium 804 is an electronic, magnetic, optical, electromagnetic, infrared, and/or a semiconductor system (or apparatus or device). For example, computer-readable storage medium 804 includes a semiconductor or solid-state memory, a magnetic tape, a removable computer diskette, a random access memory (RAM), a read-only memory (ROM), a rigid magnetic disk, and/or an optical disk. In one or more embodiments using optical disks, computer-readable storage medium 804 includes a compact disk-read only memory (CD-ROM), a compact disk-read/write (CD-R/W), and/or a digital video disc (DVD).

In one or more embodiments, storage medium 804 stores computer program code 806 configured to cause EDA system 800 (where such execution represents (at least in part) the EDA tool) to be usable for performing a portion or all of the noted processes and/or methods. In one or more embodiments, storage medium 804 also stores information which facilitates performing a portion or all of the noted processes and/or methods. In one or more embodiments, storage medium 804 stores library 817 of standard cells including such standard cells as disclosed herein.

EDA system 800 includes I/O interface 810. I/O interface 810 is coupled to external circuitry. In one or more embodiments, I/O interface 810 includes a keyboard, keypad, mouse, trackball, trackpad, touchscreen, and/or cursor direction keys for communicating information and commands to processor 802.

EDA system 800 also includes network interface 812 coupled to processor 802. Network interface 812 allows EDA system 800 to communicate with network 814, to which one or more other computer systems are connected. Network interface 812 includes wireless network interfaces such as BLUETOOTH, WIFI, WIMAX, GPRS, or WCDMA; or wired network interfaces such as ETHERNET, USB, or IEEE-1364. In one or more embodiments, a portion or all of noted processes and/or methods, is implemented in two or more EDA system.

EDA system 800 is configured to receive information through I/O interface 810. The information received through I/O interface 810 includes one or more of instructions, data, design rules, libraries of standard cells, and/or other parameters for processing by processor 802. The information is transferred to processor 802 via bus 808. EDA system 800 is configured to receive information related to a UI through I/O interface 810. The information is stored in computer-readable medium 804 as user interface (UI) 842.

In some embodiments, a portion or all of the noted processes and/or methods is implemented as a standalone software application for execution by a processor. In some embodiments, a portion or all of the noted processes and/or methods is implemented as a software application that is a part of an additional software application. In some embodiments, a portion or all of the noted processes and/or methods is implemented as a plug-in to a software application. In some embodiments, at least one of the noted processes and/or methods is implemented as a software application that is a portion of an EDA tool. In some embodiments, a portion or all of the noted processes and/or methods is implemented as a software application that is used by EDA system 800. In some embodiments, a layout diagram which includes standard cells is generated using a tool such as VIRTUOSO® available from CADENCE DESIGN SYSTEMS, Inc., or another suitable layout generating tool.

In some embodiments, the processes are realized as functions of a program stored in a non-transitory computer readable recording medium. Examples of a non-transitory computer readable recording medium include, but are not limited to, external/removable and/or internal/built-in storage or memory unit, e.g., one or more of an optical disk, such as a DVD, a magnetic disk, such as a hard disk, a semiconductor memory, such as a ROM, a RAM, a memory card, and the like.

Figure 9:
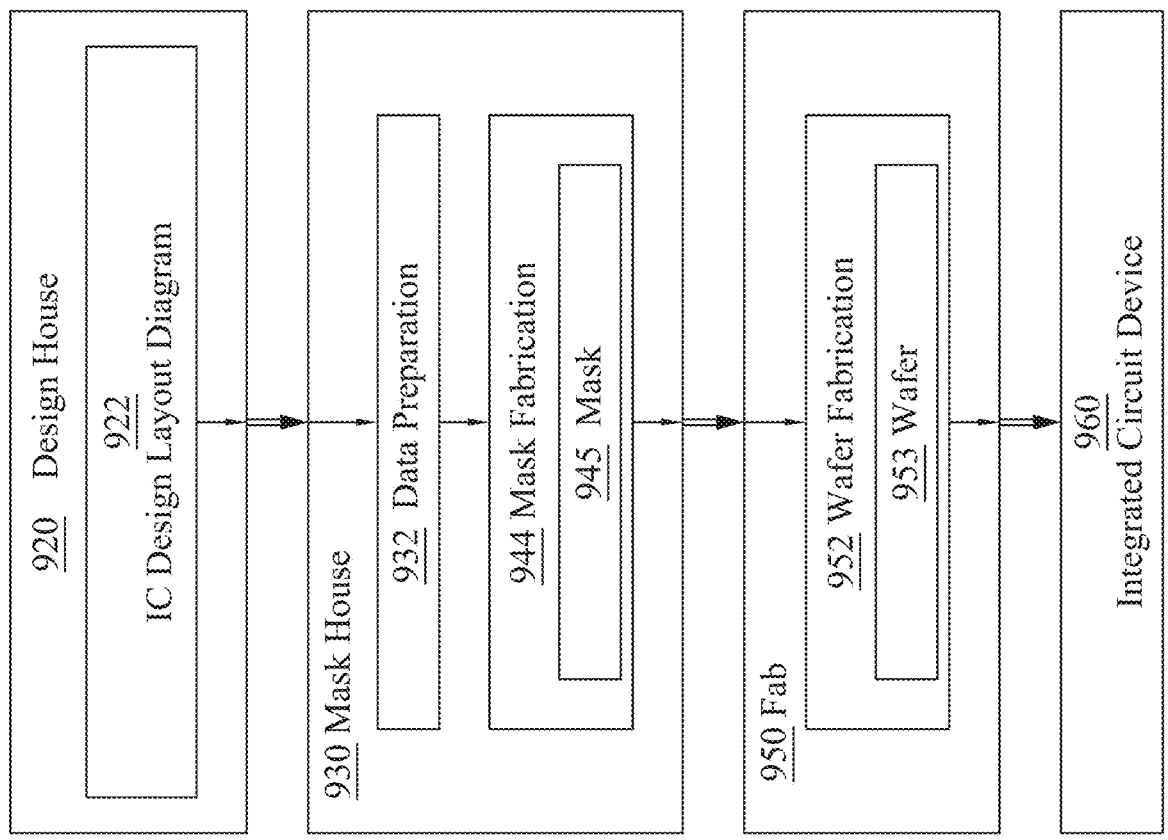
FIG. 9 is a block diagram of an integrated circuit (IC) manufacturing system, and an IC manufacturing flow associated therewith, in accordance with some embodiments.

FIG. 9 is a block diagram of an integrated circuit (IC) manufacturing system, and an IC manufacturing flow associated therewith, in accordance with some embodiments. In some embodiments, based on a layout diagram, at least one of (A) one or more semiconductor masks or (B) at least one component in a layer of a semiconductor integrated circuit is fabricated using manufacturing system 900.

In FIG. 9, IC manufacturing system 900 includes entities, such as a design house 920, a mask house 930, and an IC manufacturer/fabricator ("fab") 950, that interact with one another in the design, development, and manufacturing cycles and/or services related to manufacturing an IC device 960. The entities in system 900 are connected by a communications network. In some embodiments, the communications network is a single network. In some embodiments, the communications network is a variety of different networks, such as an intranet and the Internet. The communications network includes wired and/or wireless communication channels. Each entity interacts with one or more of the other entities and provides services to and/or receives services from one or more of the other entities. In some embodiments, two or more of design house 920, mask house 930, and IC fab 950 is owned by a single larger company. In some embodiments, two or more of design house 920, mask house 930, and IC fab 950 coexist in a common facility and use common resources.

Design house (or design team) 920 generates an IC design layout diagram 922. IC design layout diagram 922 includes various geometrical patterns designed for an IC device 960. The geometrical patterns correspond to patterns of metal, oxide, or semiconductor layers that make up the various components of IC device 960 to be fabricated. The various layers combine to form various IC features. For example, a portion of IC design layout diagram 922 includes various IC features, such as an active region, gate electrode, source and drain, metal lines or vias of an interlayer interconnection, and openings for bonding pads, to be formed in a semiconductor substrate (such as a silicon wafer) and various material layers disposed on the semiconductor substrate. Design house 920 implements a proper design procedure to form IC design layout diagram 922. The design procedure includes one or more of logic design, physical design or place and route. IC design layout diagram 922 is presented in one or more data files having information of the geometrical patterns. For example, IC design layout diagram 922 can be expressed in a GDSII file format or DFII file format.

Mask house 930 includes mask data preparation 932 and mask fabrication 944. Mask house 930 uses IC design layout diagram 922 to manufacture one or more masks 945 to be used for fabricating the various layers of IC device 960 according to IC design layout diagram 922. Mask house 930 performs mask data preparation 932, where IC design layout diagram 922 is translated into a representative data file ("RDF"). Mask data preparation 932 provides the RDF to mask fabrication 944. Mask fabrication 944 includes a mask writer. A mask writer converts the RDF to an image on a substrate, such as a mask (reticle) 945 or a semiconductor wafer 953. The design layout diagram 922 is manipulated by mask data preparation 932 to comply with particular characteristics of the mask writer and/or requirements of IC fab 950. In FIG. 9, mask data preparation 932 and mask fabrication 944 are illustrated as separate elements. In some embodiments, mask data preparation 932 and mask fabrication 944 can be collectively referred to as mask data preparation.

In some embodiments, mask data preparation 932 includes optical proximity correction (OPC) which uses lithography enhancement techniques to compensate for image errors, such as those that can arise from diffraction, interference, other process effects and the like. OPC adjusts IC design layout diagram 922. In some embodiments, mask data preparation 932 includes further resolution enhancement techniques (RET), such as off-axis illumination, sub-resolution assist features, phase-shifting masks, other suitable techniques, and the like or combinations thereof. In some embodiments, inverse lithography technology (ILT) is also used, which treats OPC as an inverse imaging problem.

In some embodiments, mask data preparation 932 includes a mask rule checker (MRC) that checks the IC design layout diagram 922 that has undergone processes in OPC with a set of mask creation rules which contain certain geometric and/or connectivity restrictions to ensure sufficient margins, to account for variability in semiconductor manufacturing processes, and the like. In some embodiments, the MRC modifies the IC design layout diagram 922 to compensate for limitations during mask fabrication 944, which may undo part of the modifications performed by OPC in order to meet mask creation rules.

In some embodiments, mask data preparation 932 includes lithography process checking (LPC) that simulates processing that will be implemented by IC fab 950 to fabricate IC device 960. LPC simulates this processing based on IC design layout diagram 922 to create a simulated manufactured device, such as IC device 960. The processing parameters in LPC simulation can include parameters associated with various processes of the IC manufacturing cycle, parameters associated with tools used for manufacturing the IC, and/or other aspects of the manufacturing process. LPC takes into account various factors, such as aerial image contrast, depth of focus ("DOF"), mask error enhancement factor ("MEEF"), other suitable factors, and the like or combinations thereof. In some embodiments, after a simulated manufactured device has been created by LPC, if the simulated device is not close enough in shape to satisfy design rules, OPC and/or MRC are be repeated to further refine IC design layout diagram 922.

It should be understood that the above description of mask data preparation 932 has been simplified for the purposes of clarity. In some embodiments, mask data preparation 932 includes additional features such as a logic operation (LOP)

to modify the IC design layout diagram 922 according to manufacturing rules. Additionally, the processes applied to IC design layout diagram 922 during mask data preparation 932 may be executed in a variety of different orders.

After mask data preparation 932 and during mask fabrication 944, a mask 945 or a group of masks 945 are fabricated based on the modified IC design layout diagram 922. In some embodiments, mask fabrication 944 includes performing one or more lithographic exposures based on IC design layout diagram 922. In some embodiments, an electron-beam (e-beam) or a mechanism of multiple e-beams is used to form a pattern on a mask (photomask or reticle) 945 based on the modified IC design layout diagram 922. Mask 945 can be formed in various technologies. In some embodiments, mask 945 is formed using binary technology. In some embodiments, a mask pattern includes opaque regions and transparent regions. A radiation beam, such as an ultraviolet (UV) beam, used to expose the image sensitive material layer (e.g., photoresist) which has been coated on a wafer, is blocked by the opaque region and transmits through the transparent regions. In one example, a binary mask version of mask 945 includes a transparent substrate (e.g., fused quartz) and an opaque material (e.g., chromium) coated in the opaque regions of the binary mask. In another example, mask 945 is formed using a phase shift technology. In a phase shift mask (PSM) version of mask 945, various features in the pattern formed on the phase shift mask are configured to have proper phase difference to enhance the resolution and imaging quality. In various examples, the phase shift mask can be attenuated PSM or alternating PSM. The mask(s) generated by mask fabrication 944 is used in a variety of processes. For example, such a mask(s) is used in an ion implantation process to form various doped regions in semiconductor wafer 953, in an etching process to form various etching regions in semiconductor wafer 953, and/or in other suitable processes.

IC fab 950 includes wafer fabrication 952. IC fab 950 is an IC fabrication business that includes one or more manufacturing facilities for the fabrication of a variety of different IC products. In some embodiments, IC Fab 950 is a semiconductor foundry. For example, there may be a manufacturing facility for the front end fabrication of a plurality of IC products (front-end-of-line (FEOL) fabrication), while a second manufacturing facility may provide the back end fabrication for the interconnection and packaging of the IC products (back-end-of-line (BEOL) fabrication), and a third manufacturing facility may provide other services for the foundry business.

IC fab 950 uses mask(s) 945 fabricated by mask house 930 to fabricate IC device 960. Thus, IC fab 950 at least indirectly uses IC design layout diagram 922 to fabricate IC device 960. In some embodiments, semiconductor wafer 953 is fabricated by IC fab 950 using mask(s) 945 to form IC device 960. In some embodiments, the IC fabrication includes performing one or more lithographic exposures based at least indirectly on IC design layout diagram 922. Semiconductor wafer 953 includes a silicon substrate or other proper substrate having material layers formed thereon. Semiconductor wafer 953 further includes one or more of various doped regions, dielectric features, multi-level interconnects, and the like (formed at subsequent manufacturing steps).

Details regarding an integrated circuit (IC) manufacturing system (e.g., system 900 of FIG. 9), and an IC manufacturing flow associated therewith are found, e.g., in U.S. Pat. No. 9,256,709, granted Feb. 9, 2016, U.S. Pre-Grant Publication No. 20150278429, published Oct. 1, 2015, U.S. Pre-Grant Publication No. 20140040838, published Feb. 6, 2014, and U.S. Pat. No. 7,260,442, granted Aug. 21, 2007, the entireties of each of which are hereby incorporated by reference.

An integrated circuit having a modified layout of power rails, and in some embodiments, conductive lines, has increased clearance distance for electrical connections between layers of the integrated circuit. A power rail is modified in order to increase a clearance distance between a conductive line and an S/D line in a cell of the integrated circuit. A conductive line is modified in order to increase a clearance distance between a power rail or a source/drain line, and a conductive line at least one layer above the modified conductive line of the integrated circuit. Existing clearance distance amounts in a layout of an integrated circuit are used to determine whether to make a modification to the integrated circuit layout to increase the clearance distance to a modified clearance distance with more space between features of the integrated circuit or interconnection structure.

Some aspects of the present disclosure relate to a method, which includes selecting a power rail of a cell; determining that a clearance distance for an electrical connection to or around the power rail is not sufficient to fit the electrical connection; selecting a power rail portion of the power rail for modification; and modifying a shape of the power rail portion to provide a clearance distance sufficient to fit the electrical connection. In some embodiments, modifying a shape of the power rail portion includes offsetting the inner edge of the power rail portion, with regard to an inner edge of an unmodified power rail portion, and an outer edge of the power rail portion, with regard to an outer edge of the unmodified power rail portion, in a first direction. In some embodiments, modifying a shape of the power rail portion includes reducing a width of the power rail portion while maintaining a width of another portion of the power rail. In some embodiments, reducing a width of the power rail portion includes offsetting an inner edge of the power rail portion in a first direction toward a center of the power rail. In some embodiments, reducing a width of the power rail further includes offsetting an outer edge of the power rail portion in a second direction toward the center of the power rail. In some embodiments, modifying a shape of the power rail portion includes removing the power rail portion. In some embodiments, the method includes steps of determining whether to modify a conductive line paired with the power rail; selecting, upon determining to modify the conductive line paired with the power rail, a conductive line segment for modification; and modifying a shape of at least one conductive line of the cell. In some embodiments, modifying a shape of at least one conductive line includes merging a first conductive line with a second conductive line. In some embodiments, modifying a shape of at least one conductive line includes removing a first conductive line segment. In some embodiments, modifying a shape of at least one conductive line includes increasing a width, in a direction perpendicular to a length of the power rail, one of the at least one conductive line segment.

Aspects of the present disclosure relate to an integrated circuit which includes a source/drain (S/D) line in a cell of the integrated circuit; a power rail extending over the S/D line, wherein the power rail comprises a first power rail portion and a second power rail portion, and an inner edge of the first power rail portion is offset from an inner edge of the second power rail portion; and a conductive line over the power rail. In some embodiments, an outer edge of the first power rail portion is aligned with an outer edge of the second power rail portion. In some embodiments, the inner edge of the first power rail portion is offset toward a center of the second power rail portion, with respect to the inner edge of the second power rail portion. In some embodiments, an outer edge of the first power rail portion is offset from an outer edge of the second power rail portion. In some embodiments, the inner edge of the first power rail is offset toward a center of the second power rail portion, with respect to the inner edge of the second power rail portion, and wherein the outer edge of the first power rail is offset toward a center of the power rail with respect to the outer edge of the second power rail portion. the inner edge of the first power rail is offset toward a center of the second power rail portion, and wherein the outer edge of the first power rail portion is offset away from a center of the second power rail portion, with respect to the inner edge of the second power rail portion.

Aspects of the present disclosure relate to an integrated circuit which includes a cell having a source or drain line in a first layer; a first power rail over the source or drain line in a second layer; and a conductive line over the power rail, wherein the first power rail is discontinuous across a length of the cell. In some embodiments, the conductive line is continuous across an entire length of the cell. In some embodiments, the first power rail and the conductive line are on different sides of a transition point of the cell. In some embodiments, the cell includes a second power rail at an opposite end of the cell from the first power rail, where the second power rail is continuous across an entire length of the cell.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method, comprising:
    selecting a power rail of a cell;
    determining whether a clearance distance for an electrical connection to or around the power rail is not sufficient to fit the electrical connection;
    selecting a power rail portion of the power rail for modification in response to a determination that the clearance distance is not sufficient;
    modifying a shape of the power rail portion to provide a clearance distance sufficient to fit the electrical connections;
    determining whether to modify a conductive line directly above the power rail;
    selecting, upon determining to modify the conductive line, a conductive line segment for modification; and
    modifying a shape of the conductive line.

2. The method of claim 1, wherein modifying a shape of the power rail portion includes offsetting the inner edge of the power rail portion, with regard to an inner edge of an unmodified power rail portion, and an outer edge of the power rail portion, with regard to an outer edge of the unmodified power rail portion, in a first direction.

3. The method of claim 1, wherein modifying a shape of the power rail portion includes reducing a width of the power rail portion while maintaining a width of another portion of the power rail.

4. The method of claim 3, wherein reducing a width of the power rail portion includes offsetting an inner edge of the power rail portion in a first direction toward a center of the power rail.

5. The method of claim 4, wherein reducing a width of the power rail further includes offsetting an outer edge of the power rail portion in a second direction toward the center of the power rail.

6. The method of claim 1, wherein modifying a shape of the power rail portion includes removing the power rail portion.

7. The method of claim 1, further comprising:
    determining whether to modify the conductive line regardless of whether the power rail is modified.

8. The method of claim 1, wherein modifying a shape of at least one conductive line further comprises merging a first conductive line with a second conductive line.

9. The method of claim 1, wherein modifying a shape of at least one conductive line further comprises removing a first conductive line segment.

10. The method of claim 1, wherein modifying a shape of at least one conductive line further comprises increasing a width, in a direction perpendicular to a length of the power rail, one of the at least one conductive line segment.

11. A method, comprising:
    identifying a power rail of a cell;
    identifying a conductive line farther from a substrate than the power rail;
    determining whether to modify the power rail based on a type of electrical connection to a component other than the power rail and a clearance distance for implementing the type of electrical connection;
    selecting, in response to a determination to modify the power rail, a power rail portion of the power rail for modification;
    modifying a shape of the power rail portion to satisfy the clearance distance for implementing the electrical connections;
    determining whether to modify the conductive line independently of the determination to modify the power rail; and
    modifying a shape of the conductive line in response to a determination to modify the conductive line.

12. The method of claim 11, wherein modifying the shape of the power rail portion comprises implementing a full-linewidth offset, a single edge offset, a double edge offset, or a power rail truncation.

13. The method of claim 11, further comprising storing the power rail having the modified shape on a computer readable medium.

14. The method of claim 13, further comprising determining whether to modify the conductive line following storing the power rail having the modified shape.

15. The method of claim 11, further comprising determining whether to modify the conductive line in response to a determination not to modify the power rail.

16. The method of claim 11, further comprising manufacturing an integrated circuit including the power rail having the modified shape.

17. A method, comprising:
    receiving a cell including at least one power rail and a conductive line directly above the at least one power rail;

identifying each power rail of the at least one power rail;
for each identified power rail:
- determining whether to modify the identified power rail based on a type of electrical connection to a component other than the identified power rail and a clearance distance for implementing the type of electrical connection; and
- modifying, in response to a determination to modify the identified power rail, a shape of the identified power rail to satisfy the clearance distance for implementing the electrical connection;

determining whether to modify the conductive line based on the clearance distance for implementing the type of electrical connection; and modifying, in response to a determination to modify the conductive line, a shape of the conductive line.

18. The method of claim 17, wherein modifying the shape of the identified power rail comprises modifying less than an entirety of the identified power rail.

19. The method of claim 17, further comprising:
determining whether to modify the conductive line regardless of whether the at least one power rail is modified.

20. The method of claim 17, further comprising manufacturing an integrated circuit including the cell.

* * * * *